(12) United States Patent
Morishima

(10) Patent No.: US 11,502,342 B2
(45) Date of Patent: Nov. 15, 2022

(54) METHOD FOR MANUFACTURING LITHIUM ION BATTERY

(71) Applicant: TOYOTA JIDOSHA KABUSHIKI KAISHA, Toyota (JP)

(72) Inventor: Ryuta Morishima, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 260 days.

(21) Appl. No.: 17/037,885

(22) Filed: Sep. 30, 2020

(65) Prior Publication Data

US 2021/0175552 A1 Jun. 10, 2021

(30) Foreign Application Priority Data

Dec. 9, 2019 (JP) .............................. JP2019-222155

(51) Int. Cl.
| | | |
|---|---|---|
| *H01M 10/44* | (2006.01) | |
| *H01M 10/0525* | (2010.01) | |
| *H01M 10/04* | (2006.01) | |
| *H01M 4/525* | (2010.01) | |
| *H01M 4/505* | (2010.01) | |
| *H01M 4/02* | (2006.01) | |

(52) U.S. Cl.
CPC ......... *H01M 10/446* (2013.01); *H01M 4/505* (2013.01); *H01M 4/525* (2013.01); *H01M 10/04* (2013.01); *H01M 10/0525* (2013.01); *H01M 2004/027* (2013.01); *H01M 2004/028* (2013.01)

(58) Field of Classification Search
None
See application file for complete search history.

(56) References Cited

FOREIGN PATENT DOCUMENTS

JP 2017152199 A 8/2017

*Primary Examiner* — Carlos Barcena
(74) *Attorney, Agent, or Firm* — Dickinson Wright, PLLC

(57) ABSTRACT

(a) A battery including a power storage element and an electrolytic solution is assembled. (b) Initial charging is performed on the battery. (c) Alternate charging and discharging are performed on the battery after the initial charging. In the alternate charging and discharging, charging and discharging are alternately performed once or more respectively at a voltage between 4.0 V and 4.1 V and a current rate of 0.6 C or higher. The total number of times of charging and discharging is 3 or greater. The charging is performed such that the voltage changes by 0.05 V or higher and 0.1 V or lower whenever the charging is performed once. The discharging is performed such that the voltage changes by 0.05 V or higher and 0.1 V or lower whenever the discharging is performed once.

5 Claims, 5 Drawing Sheets

METHOD FOR MANUFACTURING LITHIUM ION BATTERY

CROSS-REFERENCE TO RELATED APPLICATION

This application claims priority to Japanese Patent Application No. 2019-222155 filed on Dec. 9, 2019, incorporated herein by reference in its entirety.

BACKGROUND

1. Technical Field

The present disclosure relates to a method for manufacturing a lithium ion battery.

2. Description of Related Art

Japanese Unexamined Patent Application Publication No. 2017-152199 (JP 2017-152199 A) discloses how to position a battery when an electrolytic solution is injected into the battery.

SUMMARY

A lithium ion battery (hereinafter, simply described as "battery" in some cases) includes a power storage element and an electrolytic solution. The power storage element includes a positive electrode, a negative electrode, and a separator. The separator is porous. The power storage element is impregnated with the electrolytic solution. In a case where the power storage element is unevenly impregnated with the electrolytic solution, cycle performance tends to deteriorate.

In manufacturing the battery, in order for the power storage element to be evenly impregnated with the electrolytic solution, various operations are performed. Conventionally, for example, the power storage element is impregnated with the electrolytic solution in an environment with reduced pressure. However, the way the power storage element is impregnated with the electrolytic solution needs to be further improved. For instance, sometimes the electrolytic solution does not fully permeate pores of the separator.

An object of the present disclosure is to improve cycle performance.

Hereinafter, technical configurations and effects of the present disclosure will be described. However, some parts of the mechanism of action of the present disclosure are based on assumption. Whether the action of mechanism is right or wrong does not limit claims.

[1] A method for manufacturing a lithium ion battery includes the following (a), (b) and (c).

(a) Assembling a battery including a power storage element and an electrolytic solution.

(b) Performing initial charging on the battery.

(c) Performing alternate charging and discharging on the battery after the initial charging.

The power storage element includes a positive electrode, a negative electrode, and a separator. The separator includes a portion interposed between the positive electrode and the negative electrode. The separator is porous.

In the alternate charging and discharging, charging and discharging are alternately performed once or more respectively at a voltage between 4.0 V and 4.1 V and a current rate of 0.6 C or higher. The total number of times of charging and discharging is 3 or greater. The charging is performed such that the voltage changes by 0.05 V or higher and 0.1 V or lower whenever the charging is performed once. The discharging is performed such that the voltage changes by 0.05 V or higher and 0.1 V or lower whenever the discharging is performed once.

According to the new findings of the present disclosure, at a voltage between 4.0 V and 4.1 V, a special phenomenon occurs in the battery.

FIG. 1 is a graph showing a relationship between a voltage and a value of force to voltage calculated by differentiation.

The abscissa in FIG. 1 is a voltage (V) of a battery. The ordinate in FIG. 1 is a value of a force (F) to the voltage (V) of the battery (dF/dV) calculated by differentiation. The force (F) is considered to increase or decrease as each of the positive electrode and negative electrode expands or contracts. The force (F) can be measured, for example, by a sheet-like pressure sensor. The pressure sensor is disposed, for example, to contact the external surface of a battery.

As shown in FIG. 1, "dF/dV" is positive at around 4.0 V. Furthermore, "dF/dV" is maximized at around 4.0 V. As the battery is discharged and thus the voltage approaches 4.0 V, "FN" increases. The change at around 4.0 V is considered to result from the expansion and contraction of the negative electrode. The separator includes a portion interposed between the positive electrode and the negative electrode. At around 4.0 V, the force of the negative electrode pressing the separator sharply increases. It is considered that the pores in the separator may contract due to the increase in the force pressing the separator. It is considered that the contraction of the pores may cause the electrolytic solution to be discharged from the pores.

"dF/dV" is negative at around 4.1 V. Furthermore, "dF/dV" is minimized at around 4.1 V. As the battery is charged and thus the voltage approaches 4.1 V, "FN" decreases. The change at around 4.1 V is considered to result from the expansion and contraction of the positive electrode. At around 4.1 V, the force of the positive electrode pressing the separator sharply decreases. It is considered that the pores in the separator may expand due to the decrease in the force pressing the separator. It is considered that the electrolytic solution may be aspirated into the pores due to the expansion of the pores.

In the present disclosure, "alternate charging and discharging" is performed on a battery. That is, charging and discharging are alternately performed at a voltage between 4.0 V and 4.1 V. In the alternate charging and discharging, each of the charging and discharging is performed such that the voltage changes by 0.05 V or higher and 0.1 V or lower. That is, each of the charging and discharging is performed such that the sign of "dF/dV" in FIG. 1 changes. It is considered that as a result, the pores in the separator may alternate between contraction and expansion. It is expected that the contraction and expansion will allow the electrolytic solution to permeate deep into the pores of the separator. It is expected that the permeation of the electrolytic solution deep into the pores of the separator will improve cycle performance.

In the alternate charging and discharging, a current rate is 0.6 C or higher. In a case where the current rate is less than 0.6 C, sufficient cycle performance is unlikely to be produced. In a case where the current rate is less than 0.6 C, the pores contract and expand slowly. It is considered that as a result, the electrolytic solution could not permeate deep into the pores.

In the alternate charging and discharging, the total number of times of charging and discharging is 3 or greater. Hereinafter, "the total number of times of charging and discharging" will be also described as "the number of times of charging and discharging". It is considered that in a case where the number of times of charging and discharging is less than 3, the electrolytic solution could not permeate deep into the pores.

[2] The positive electrode contains a positive electrode active material.

The positive electrode active material may contain, for example, a material represented by the following Formula (1):

$$LiNi_xCO_yM_zO_2 \quad (1)$$

"M" in the Formula (1) may contain at least one metal selected from the group consisting of Mn and Al. x, y, and z in the Formula (1) may satisfy the relationship of "0.8≤x<1, 0<y, 0<z, and x+y+z=1".

The material represented by the Formula (1) is also described as "high-nickel material". In a case where the positive electrode active material contains the high-nickel material, the change of "dF/dV" at around 4.1 V tends to increase. It is expected that as a result, the permeation of the electrolytic solution will be facilitated.

[3] The negative electrode contains a negative electrode active material. The negative electrode active material may contain, for example, a material represented by the following Formula (2):

$$SiO_w \quad (2)$$

w in the Formula (2) may satisfy the relationship of "0<w<2".

The material represented by the Formula (2) is also described as "Si-based material". In a case where the negative electrode active material contains the Si-based material, the change of "dF/dV" at around 4.0 V tends to increase. It is expected that as a result, the permeation of the electrolytic solution will be facilitated.

[4] The current rate in the alternate charging and discharging may be, for example, 2.6 C or lower.

The higher the current rate in the alternate charging and discharging, the shorter the time required. However, in a case where the current rate is excessively high, the irreversible capacity in the alternate charging and discharging is likely to increase. In a case where the current rate is 2.6 C or lower, it is expected that the irreversible capacity in the alternate charging and discharging will be reduced.

[5] The alternate charging and discharging may end, for example, with charging.

For example, in a case where the number of times of charging and discharging is 3, charging and discharging can be alternately performed in order of "charging→discharging→charging". It is considered that the electrolytic solution may be discharged from the pores of the separator during discharging. It is considered that the electrolytic solution may be aspirated into the pores of the separator during charging. It is considered that in a case where the alternate charging and discharging end with charging, the alternate charging and discharging end in a state where the pores of the separator are rich in the electrolytic solution. It is expected that as a result, the cycle performance will be improved.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the present disclosure (hereinbelow, also referred to as "the present embodiment") will be described. However, claims are not limited to the following description.

In the present embodiment, "1 C" is defined as a current rate at which a battery achieves its full charge capacity within 1 hour by charging (or discharging). For example, "0.6 C" represents a current rate that is 60% of "1 C".

Method for Manufacturing Lithium Ion Battery

Figure 2:
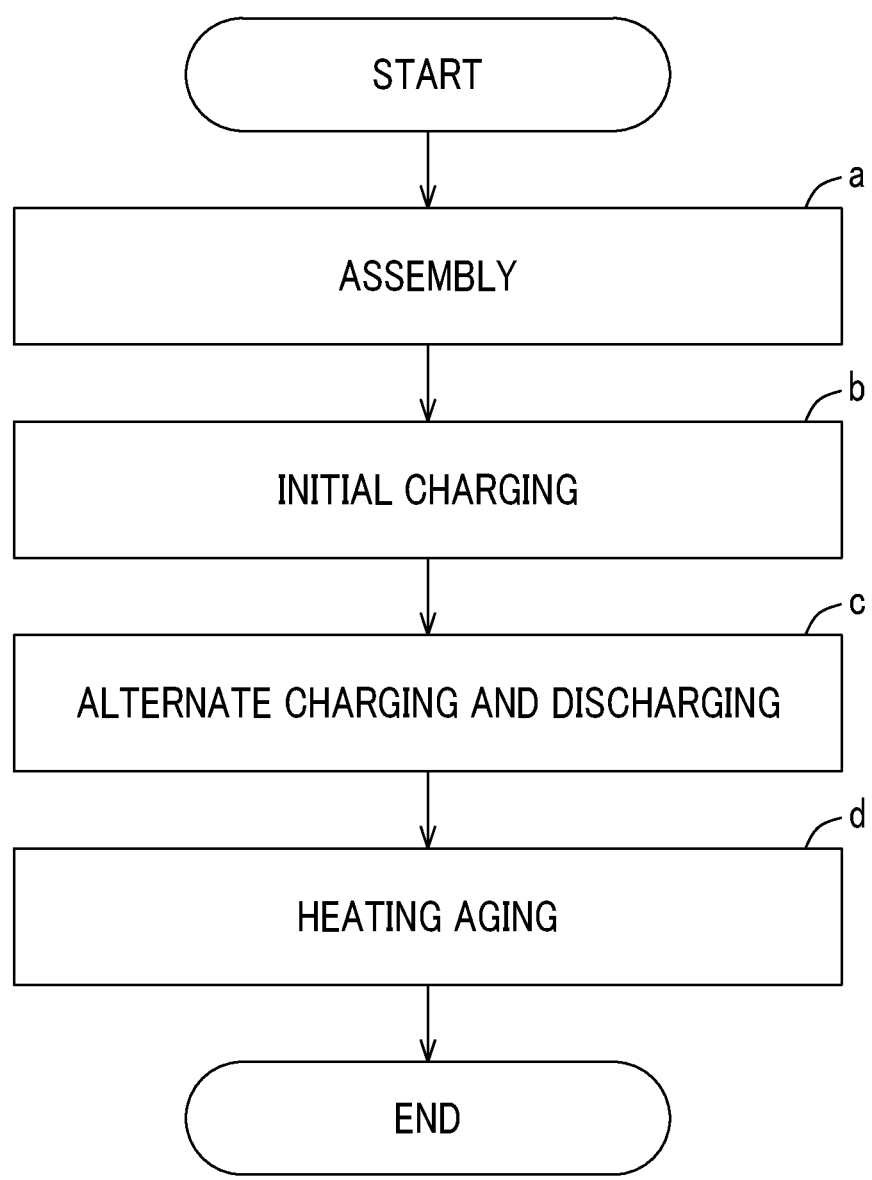
FIG. 2 is a schematic flowchart of a method for manufacturing a lithium ion battery in the present embodiment.

FIG. 2 is a schematic flowchart of a method for manufacturing a lithium ion battery in the present embodiment. The method for manufacturing a lithium ion battery in the present embodiment includes (a) Assembly, (b) Initial charging, and (c) Alternate charging and discharging.

The method for manufacturing a lithium ion battery in the present embodiment may further include, for example, (d) Heating aging after (c) Alternate charging and discharging.

(a) Assembly

The method for manufacturing a lithium ion battery in the present embodiment includes the assembly of a battery. In the present embodiment, "lithium ion battery" means a secondary battery that contains lithium (Li) ions as a charge carrier. The battery of the present embodiment can be in any form. For example, the battery may be in the form of a square battery, a cylindrical battery, or a pouch-type battery. The battery can be assembled by any method. In the present embodiment, a pouch-type battery will be described as an example. The pouch-type battery is also called a laminate-type battery.

Lithium Ion Battery

Figure 3:
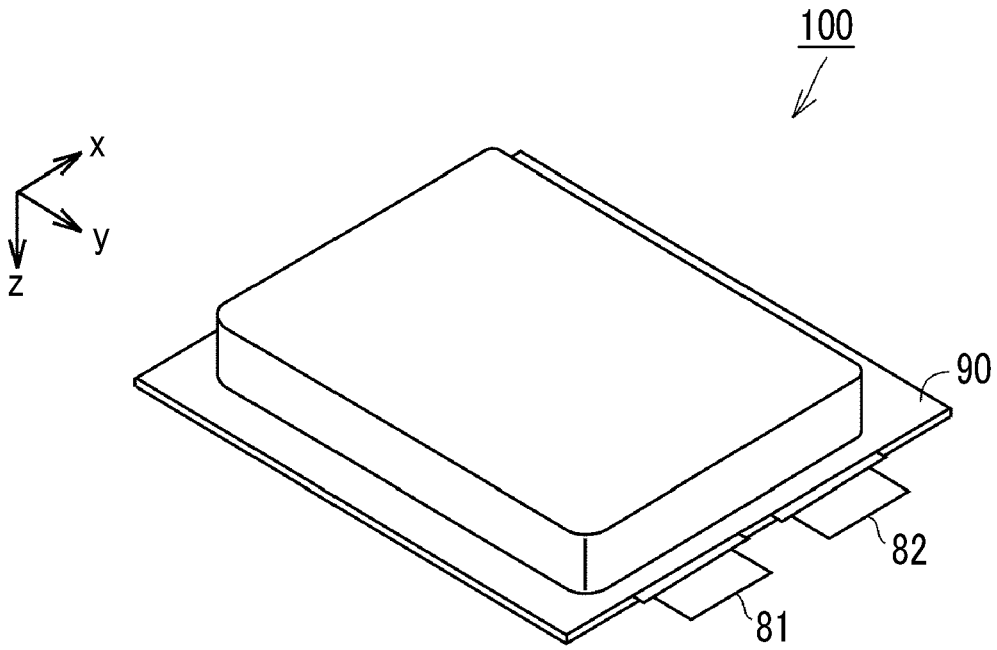
FIG. 3 is a first schematic view of a lithium ion battery in the present embodiment.

FIG. 3 is a first schematic view of a lithium ion battery in the present embodiment.

A battery 100 is a pouch-type battery. The battery 100 includes an exterior material 90. The exterior material 90 is a pouch made of an aluminum laminated film. The exterior material 90 is sealed. The exterior material 90 can be sealed, for example, by heat sealing. Each of the positive electrode terminal 81 and negative electrode terminal 82 is exposed to the outside of the exterior material 90.

Figure 4:
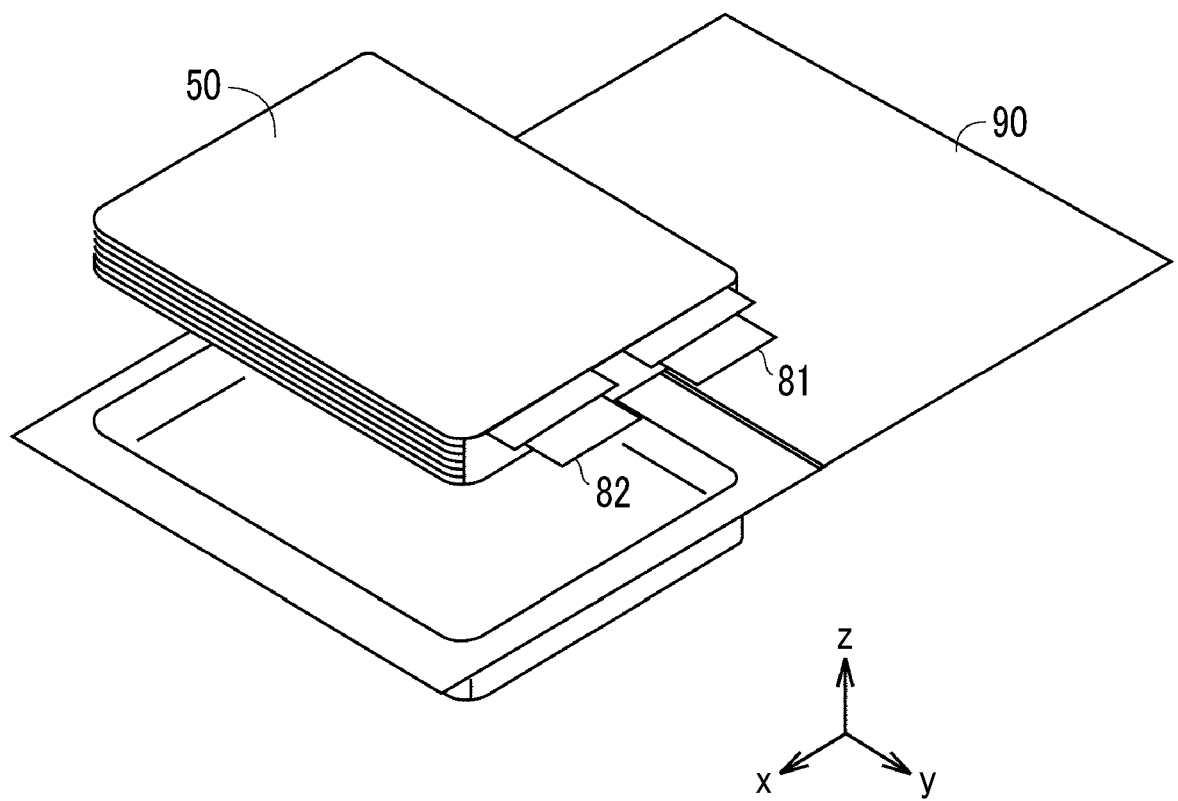
FIG. 4 is a second schematic view of the lithium ion battery in the present embodiment.

FIG. 4 is a second schematic view of the lithium ion battery in the present embodiment. The exterior material 90 accommodates a power storage element 50 and an electrolytic solution (not shown in the drawing). That is, the battery 100 includes the power storage element 50 and an electrolytic solution. The positive electrode terminal 81 and the negative electrode terminal 82 are connected to the power storage element 50.

Figure 5:
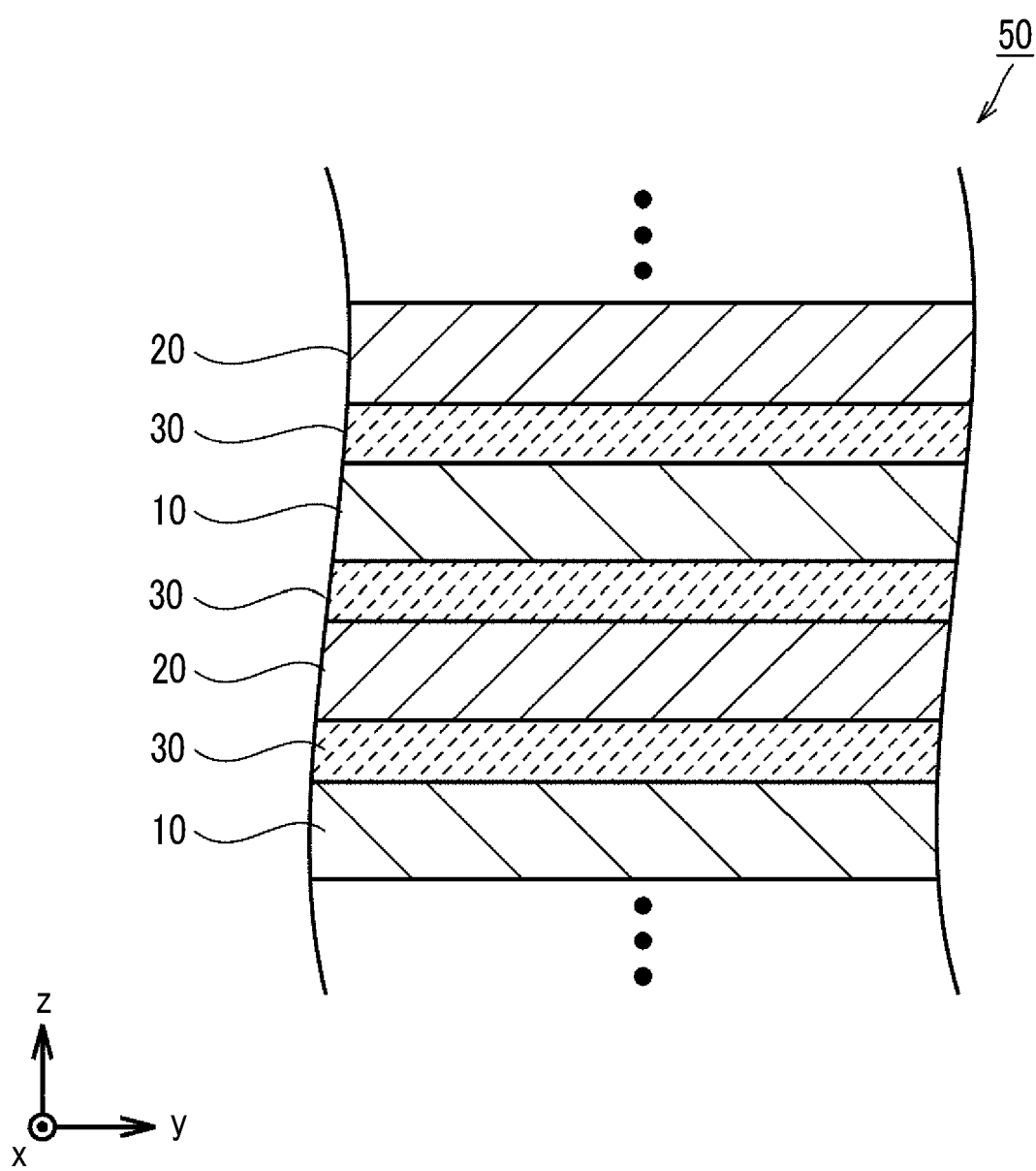
FIG. 5 is a schematic cross-sectional view of a power storage element in the present embodiment.

FIG. 5 is a schematic cross-sectional view of the power storage element in the present embodiment.

The power storage element 50 includes a positive electrode 10, a negative electrode 20, and a separator 30. The power storage element 50 is in the form of a laminate. The power storage element 50 is formed by alternately laminating the positive electrode 10 and the negative electrode 20. The separator 30 is disposed between the positive electrode 10 and the negative electrode 20. The power storage element 50 may be in the form of a roll.

Positive Electrode

The positive electrode 10 is in the form of a sheet. The positive electrode 10 may have a thickness of 10 μm or greater and 200 μm or smaller, for example. The positive electrode 10 can be formed, for example, by coating the surface of a positive electrode current collector with a positive electrode mixture. The positive electrode current collector may include, for example, an aluminum (Al) foil. The positive electrode mixture contains a positive electrode active material. That is, the positive electrode 10 contains a positive electrode active material.

The positive electrode active material may be a group of particles, for example. The positive electrode active material may have a median diameter of 1 μm or greater and 20 μm or smaller, for example. "Median diameter" refers to a particle size at which the cumulative volume of particles summated from small particles in a volume-based particle size distribution accounts for 50% of the total volume of particles. The median diameter can be measured by a laser diffraction-type particle size distribution analyzer.

The positive electrode active material may contain any component. The positive electrode active material may contain, for example, at least one compound selected from the group consisting of lithium cobalt oxide, lithium nickel oxide, lithium manganate, nickel cobalt lithium manganate, nickel cobalt lithium aluminate, and lithium iron phosphate.

The positive electrode active material may contain, for example, a material represented by the following Formula (1):

$$LiNi_xCo_yM_zO_2 \qquad (1)$$

"M" in the Formula (1) may contain at least one metal selected from the group consisting of Mn and Al. x, y, and z in the Formula (1) may satisfy the relationship of "$0.8 \leq x < 1$, $0 < y$, $0 < z$, and $x+y+z=1$".

In a case where the positive electrode active material contains the high-nickel material represented by the Formula (1), it is expected that the permeation of the electrolytic solution will be facilitated in the alternate charging and discharging that will be described later.

"M" in the Formula (1) may substantially consist of Mn and Al. "M" may substantially consist of Mn or Al. "M" may further contain at least one metal selected from the group consisting of Mg, Ca, Ti, V, Nb, Zr, Cr, Mo and W, in addition to Mn and Al.

x, y, and z in the Formula (1) may satisfy, for example, the relationship of "$0.8 \leq x < 0.9$, $0 < y < 0.2$, and $0 < z < 0.1$". For instance, x, y, and z may satisfy the relationship of "$0.85 \leq x \leq 0.88$, $0.1 \leq y < 0.15$, and $0 < z \leq 0.05$".

The positive electrode mixture may further contain, for example, a conductive material and a binder, in addition to the positive electrode active material. The conductive material may contain any component. The conductive material may contain, for example, at least one component selected from the group consisting of acetylene black (AB), vapor grown carbon fiber (VGCF), carbon nanotube (CNT), and graphene flakes. The mixing amount of the conductive material may be, for example, 0.1 parts by mass or more and 10 parts by mass or less with respect to 100 parts by mass of the positive electrode active material.

The binder may contain any component. The binder may contain, for example, at least one component selected from the group consisting of polyvinylidene fluoride (PVdF), a vinylidene fluoride-hexafluoropropylene copolymer (PVdF-HFP), polytetrafluoroethylene (PTFE), carboxymethyl cellulose (CMC), and polyacrylic acid (PAA). The mixing amount of the binder may be, for example, 0.1 parts by mass or more and 10 parts by mass or less with respect to 100 parts by mass of the positive electrode active material.

Negative Electrode

The negative electrode 20 is in the form of a sheet. The negative electrode 20 may have a thickness of 10 μm or greater and 200 μm or smaller, for example. The negative electrode 20 can be formed, for example, by coating the surface of a negative electrode current collector with a negative electrode mixture. The negative electrode current collector may include, for example, a copper (Cu) foil. The negative electrode mixture contains a negative electrode active material. That is, the negative electrode 20 contains a negative electrode active material.

The negative electrode active material may be, for example, a group of particles. The negative electrode active material may have a median diameter of 0.1 μm or greater and 10 μm or smaller, for example.

The negative electrode active material may contain any component. The negative electrode active material may contain at least one component selected from the group consisting of, for example, graphite, soft carbon, hard carbon, silicon (Si), silicon oxide, a silicon group alloy, tin (Sn), tin oxide, a tin group alloy, and lithium titanate.

The negative electrode active material may contain, for example, a material represented by the following Formula (2):

$$SiO_w \qquad (2)$$

w in the Formula (2) may satisfy the relationship of "$0 \leq w < 2$".

In a case where the negative electrode active material contains the Si-based material represented by the Formula (2), it is expected that the permeation of the electrolytic solution will be facilitated in the alternate charging and discharging that will be described later. In a case where w in the Formula (2) is 0, the Si-based material is simple Si. When w is greater than 0, the Si-based material is silicon oxide. For example, w may satisfy the relationship of "$0.5 \leq w \leq 1.5$". The negative electrode active material may contain either simple Si or silicon oxide. The negative electrode active material may contain both the simple Si and silicon oxide.

The negative electrode active material may substantially consist only of a Si-based material, for example. The negative electrode active material may contain, for example, a Si-based material and graphite. In a case where the negative electrode active material is a mixture of a Si-based material and graphite, it is expected that high capacity and cycle performance will be simultaneously achieved. The mixing amount of the Si-based material may be, for example, 1 part by mass or more and 20 parts by mass or less with respect to 100 parts by mass of graphite. The mixing amount of the Si-based material may be, for example, 3 parts by mass or more and 15 parts by mass or less with respect to 100 parts by mass of graphite. The mixing amount of the Si-based material may be, for example, 5 parts by mass or more and 10 parts by mass or less with respect to 100 parts by mass of graphite.

The negative electrode mixture may further contain, for example, a conductive material and a binder, in addition to the negative electrode active material. The conductive material may contain any component. The conductive material may contain, for example, at least one component selected from the group consisting of AB, VGCF, CNT, and graphene flakes. The mixing amount of the conductive material may be, for example, 0.1 parts by mass or more and 10 parts by mass or less with respect to 100 parts by mass of the negative electrode active material.

The binder may contain any component. The binder may contain, for example, at least one component selected from the group consisting of styrene butadiene rubber (SBR), butyl rubber (IIR), polyimide (PI), CMC, and PAA. The mixing amount of the binder may be, for example, 0.1 parts by mass or more and 10 parts by mass or less with respect to 100 parts by mass of the negative electrode active material.

Separator

The separator 30 physically separates the positive electrode 10 and the negative electrode 20 from each other. The separator 30 includes a portion interposed between the positive electrode 10 and the negative electrode 20. Substantially the entirety of the separator 30 may be interposed between the positive electrode 10 and the negative electrode 20. The separator 30 may include a portion that is not interposed between the positive electrode 10 and the negative electrode 20. For example, the peripheral edge of the separator 30 may not be interposed between the positive electrode 10 and the negative electrode 20.

The separator 30 in the form of a film. The separator 30 may have a thickness of 5 μm or greater and 30 μm or smaller, for example. The separator 30 is porous. A plurality of pores is formed on the inside of the separator 30. The pores can retain the electrolytic solution. The separator 30 may have a porosity of 30% or higher and 60% or lower, for example. The porosity can be measured by mercury intrusion porosimetry.

The separator 30 may be made of polyolefin, for example. The separator 30 may be made of polyethylene (PE), for example. The separator 30 may be made of polypropylene (PP), for example. The separator 30 may have a single layer structure, for example. The separator 30 may consist only of a PE layer, for example. The separator 30 may have a multilayer structure, for example. The separator 30 may be formed, for example, by laminating a PP layer, a PE layer, and a PP layer in this order. The surface of the separator 30 may be coated with a group of ceramic particles, for example. The group of ceramic particles can impart heat resistance to the surface of the separator 30.

Electrolytic Solution

The electrolytic solution is a Li ion conductor. The electrolytic solution contains a solvent and a supporting electrolyte. The solvent may contain, for example, at least one compound selected from the group consisting of ethylene carbonate (EC), propylene carbonate (PC), ethylmethyl carbonate (EMC), dimethyl carbonate (DMC), and diethyl carbonate (DEC).

The supporting electrolyte is dissolved in the solvent. The supporting electrolyte may contain, for example, at least one electrolyte selected from the group consisting of $LiPF_6$, $LiBF_4$, and $Li(FSO_2)_2N$. The concentration of the supporting electrolyte may be, for example, 0.5 mol/L to 2 mol/L.

The electrolytic solution may further contain various additives in addition to the solvent and the supporting electrolyte. The additives may include, for example, at least one compound selected from the group consisting of fluoroethylene carbonate (FEC) and vinylene carbonate (VC).

(b) Initial Charging

The method for manufacturing a lithium ion battery in the present embodiment includes performing initial charging on the battery 100. The initial charging is performed using a charging device. The charging device may be a charging and discharging device. The initial charging may be performed in an environment with room temperature. For example, the initial charging may be performed in an environment with a temperature of 15° C. or higher and 30° C. or lower.

The initial charging may be, for example, constant current (CC) charging. The current rate in the initial charging may be, for example, 0.1 C or higher and 2 C or lower. The current rate may be, for example, 0.1 C or higher and 1 C or lower. The initial charging may be performed until the voltage of the battery becomes, for example, 4.0 V or higher and 4.2 V or lower. The initial charging may be performed until the voltage of the battery becomes, for example, 4.0 V or higher and 4.1 V or lower.

(c) Alternate Charging and Discharging

The method for manufacturing a lithium ion battery in the present embodiment includes performing alternate charging and discharging on the battery 100 after the initial charging. In the alternate charging and discharging, charging and discharging are alternately performed once or more respectively. It is considered that the alternate charging and discharging may cause the pores of the separator to alternate between contraction and expansion. It is expected that as a result, the permeation of the electrolytic solution will be facilitated.

The alternate charging and discharging are performed using a charging and discharging device. The alternate charging and discharging can be performed in an environment with room temperature. For example, the alternate charging and discharging may be performed in an environment with a temperature of 15° C. or higher and 30° C. or lower. When the initial charging is performed using a charging and discharging device, the alternate charging and discharging may be performed after the initial charging. That is, the initial charging and the alternate charging and discharging may be performed in succession.

Voltage Range

The voltage in the alternate charging and discharging is in a range from 4.0 V to 4.1 V. That is, the alternate charging and discharging are performed at a voltage between 4.0 V and 4.1 V. For example, charging at a voltage from 4.0 V to 4.1 V and discharging at a voltage from 4.1 V to 4.0 V may be performed alternately. For instance, charging at a voltage higher than 4.0 V and lower than 4.1 V and discharging at a voltage lower than 4.1 V and higher than 4.0 V may be performed alternately.

Figure 1:
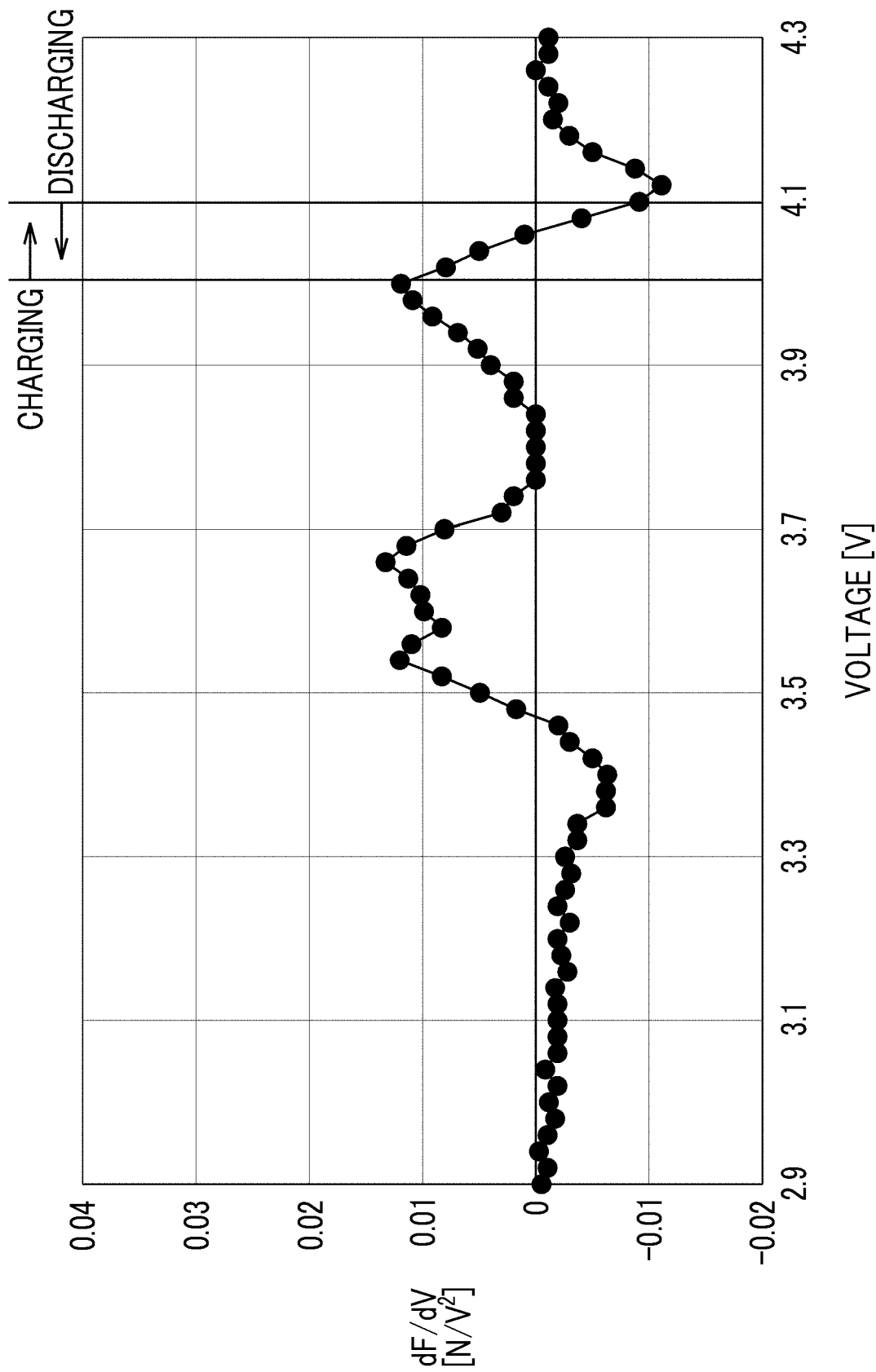
FIG. 1 is a graph showing a relationship between a voltage and a value of force to voltage calculated by differentiation.

In the alternate charging and discharging, charging is performed such that the voltage changes by 0.05 V or higher and 0.1 V or lower whenever the charging is performed once. Furthermore, discharging is performed such that the voltage changes by 0.05 V or higher and 0.1 V or lower whenever the discharging is performed once. That is, each of the charging and discharging is performed such that the sign of "dF/dV" in FIG. 1 changes. It is considered that the permeation of the electrolytic solution is facilitated by the change of the sign of "dF/dV".

Current Rate

The charging and discharging in the alternate charging and discharging may be, for example, CC charging and CC discharging respectively. The current rate in the alternate charging and discharging is 0.6 C or higher. In a case where the current rate is less than 0.6 C, sufficient cycle performance is unlikely to be produced. In a case where the current rate is less than 0.6 C, the pores contract and expand slowly. It is considered that as a result, the electrolytic solution could not permeate deep into the pores.

The higher the current rate in the alternate charging and discharging, the shorter the time required. The current rate may be, for example, 0.8 C or higher, 1.0 C or higher, 1.2 C or higher, 1.4 C or higher, 1.6 C or higher, or 1.8 C or higher.

However, in a case where the current rate is excessively high, the irreversible capacity in the alternate charging and discharging is likely to increase. The current rate may be, for example, 2.6 C or lower. In a case where the current rate is 2.6 C or lower, it is expected that the irreversible capacity in the alternate charging and discharging will be reduced. The current rate may be, for example, 2.4 C or lower, 2.2 C or lower, or 2.0 C or lower.

Number of Times of Charging and Discharging

In the alternate charging and discharging, the total number of times of charging and discharging is 3 or greater. It is considered that in a case where the number of times of charging and discharging is less than 3, the electrolytic solution could not permeate deep into the pores.

In a case where the number of times of charging and discharging is 3 or greater, the pores of the separator can be saturated with the electrolytic solution. In a case where the pores of the separator are saturated with the electrolytic solution, even though the alternate charging and discharging are performed further, the cycle performance tends to be improved little. The smaller the number of times of charging and discharging, the shorter the required time can be. The number of times of charging and discharging may be, for example, 10 or less, 9 or less, 8 or less, 7 or less, 6 or less, 5 or less, or 4 or less.

The alternate charging and discharging may end with charging, for example. For example, in a case where the number of times of charging and discharging is 3, charging and discharging can be alternately performed in order of "charging discharging charging". It is considered that the electrolytic solution may be discharged from the pores of the separator during discharging. It is considered that the electrolytic solution may be aspirated into the pores of the separator during charging. It is considered that in a case where the alternate charging and discharging end with charging, the alternate charging and discharging end in a state where the pores of the separator are rich in the electrolytic solution. It is expected that as a result, the cycle performance will be improved.

The alternate charging and discharging may start with discharging, for example. The alternate charging and discharging may start with charging, for example.

(d) Heating Aging

The method for manufacturing a lithium ion battery in the present embodiment may further include performing heating aging on the battery 100 after the alternate charging and discharging.

"Heating aging" in the present embodiment means that the battery 100 is left for a predetermined period of time in an environment with a temperature of 40° C. or higher. For example, the battery 100 may be left in a thermostatic bath set to a predetermined temperature. In the present embodiment, in a case where the set temperature of the thermostatic bath is 60° C., it is considered that the heating aging is performed in an environment with a temperature of 60° C.

The voltage of the battery at the start of the heating aging may be, for example, 3.0 V or higher and 4.0 V or lower. The voltage may be, for example, 3.2 V or higher and 3.8 V or lower. The voltage may be 3.4 V or higher and 3.6 V or lower.

The temperature environment in the heating aging may be, for example, 40° C. or higher and 80° C. or lower. The temperature environment may be, for example, 40° C. or higher and 70° C. or lower. The temperature environment may be, for example, 50° C. or higher and 70° C. or lower.

In the heating aging, the battery may be left, for example, for 6 hours or longer and 120 hours or shorter. The battery may be left, for example, for 12 hours or longer and 96 hours or shorter. The battery may be left, for example, for 12 hours or longer and 72 hours or shorter. The battery may be left, for example, for 24 hours or longer and 48 hours or shorter.

A lithium ion battery is completed in the manner described above. The lithium ion battery (finished product) in the present embodiment is expected to demonstrate excellent cycle performance, because the electrolytic solution has permeated deep into the pores of the separator.

Hereinafter, an example of the present disclosure (hereinbelow, also referred to as "the present example") will be described. However, claims are not limited to the following description.

Manufacturing of Lithium Ion Battery (a) Assembly

1. Manufacturing of Positive Electrode

The following materials were prepared.

Positive electrode active material: nickel cobalt lithium manganate (median diameter=10 μm), Nickel cobalt lithium aluminate (median diameter=10 μm)

Conductive material: AB

Binder: PVdF

Dispersion medium: N-methyl-2-pyrrolidone

Positive electrode current collector: Al foil

In the nickel cobalt lithium manganate, the ratio of the amount of substance of Mn to the total amount of substances of Ni, Co, and Mn was 0.85. In the nickel cobalt lithium aluminate, the ratio of the amount of substance of Al to the total amount of substances of Ni, Co, and Al was 0.88.

A slurry was prepared by mixing together the positive electrode active material, the conductive material, the binder, and the dispersion medium. The surfaces (both the front and back surfaces) of the positive electrode current collector were coated with the slurry and then dried. In this way, the surfaces of the positive electrode current collector were coated with a positive electrode mixture. The composition of the positive electrode mixture was "positive electrode active material/conductive material/binder=87/10/3 (mass ratio)".

An original positive electrode was manufactured in the manner described above. A plurality of positive electrodes was manufactured by cutting the original positive electrode.

2. Manufacturing of Negative Electrode

The following materials were prepared.

Negative electrode active material: artificial graphite (commercial product),

SiO [Si/O=1/1 (molar ratio)]

Binder: SBR/CMC=1/1 (mass ratio) Dispersion medium: water Negative electrode current collector: Cu foil A negative electrode active material was prepared by mixing 5 parts by mass of SiO with 100 parts by mass of the artificial graphite.

A slurry was prepared by mixing together the negative electrode active material, the binder, and the dispersion medium. The surfaces (both the front and back surfaces) of the negative electrode current collector were coated with the slurry and dried. In this way, the surfaces of the negative electrode current collector were coated with a negative electrode mixture. The composition of the negative electrode mixture was "negative electrode active material/binder=96/4 (mass ratio)".

An original negative electrode was manufactured in the manner described above. A plurality of negative electrodes was manufactured by cutting the original negative electrode.

3. Formation of Power Storage Element

A separator was prepared. The positive electrodes and negative electrodes were alternately laminated. The separator was disposed between a positive electrode and a negative electrode. In this way, a power storage element was formed. The power storage element included 7 positive electrodes and 8 negative electrodes. The terminals of the positive electrodes and negative electrodes were connected to the power storage element.

4. Injection

As an exterior material, a pouch made of an aluminum laminated film was prepared. The power storage element was accommodated in the exterior material. The electrolytic solution was injected into the exterior material. The electrolytic solution contained the following components.

Solvent: "EC/DMC/EMC=3/4/3 (volume ratio)"
Supporting electrolyte: $LiPF_6$ (concentration=1.0 mol/L)

After the injection of the electrolytic solution, the exterior material was sealed by heat sealing. In this manner, a test battery was assembled. In the present example, 160 test batteries were prepared.

(b) Initial Charging

Two metal plates were prepared. Each test battery was sandwiched between two metal plates. The two metal plates were fixed such that a predetermined pressure was applied to the power storage element.

A current equivalent to 1 C was calculated from the mass of the active material contained in each test battery. In an environment with a temperature of 25° C., each test battery was charged to 4.0 V at a current rate of 0.2 C. The charging was performed by a CC method.

(c) Alternate Charging and Discharging

In an environment with a temperature of 25° C., alternate charging and discharging were performed on each test battery under the respective conditions shown in the following Table 1. Charging was performed by a CC method at a voltage of 4.0 V to 4.1 V. Discharging was performed by a CC method at a voltage of 4.1 V to 4.0 V.

In the present example, the current rate is divided into 16 levels ranging from 0.2 C to 3.2 C with an increment of 0.2 C. In the present example, the number of times of charging and discharging is divided into 10 levels from 1 to 10. That is, in the present example, a total of 160 levels of tests were performed.

(d) Heating Aging

After the alternate charging and discharging ended, each test battery was discharged at a current rate of 0.2 C until the voltage dropped to 3.5 V. The discharging method was a CC method. The test battery was left for 24 hours in a thermostatic bath set to 60° C.

Cycle Test

1. Capacity Measurement

After the heating aging, each test battery was fully charged. The initial capacity was measured by discharging each test battery in an environment with a temperature of 25° C. under the following conditions.

Discharging method: CC method
Current rate: 0.1 C
Voltage range: 4.2 V to 3.0 V

2. Charging and Discharging Cycle

The following operations performed in order of "charging pause discharging pause" in an environment with a temperature of 25° C. was regarded as one charging and discharging cycle, and this cycle was repeated 100 times.

Charging: CC method, current rate=0.5 C, final voltage=4.2 V
Pause: 5 seconds
Discharging: CC method, current rate=0.5 C, final voltage=3.0 V
Pause: 5 seconds 3. Capacity retention rate After the charging and discharging cycles, a post-cycle capacity was measured under the same conditions as those adopted for measuring the initial capacity. A capacity retention rate was calculated by dividing the post-cycle capacity by the initial capacity. The capacity retention rate is shown in the following Table 1. In the following Table 1, for example, in a case where the number of times of charging and discharging in the alternate charging and discharging is "6" and the current rate is "1.0 C", the capacity retention rate is "97%". It is considered that the higher the capacity retention rate, the higher the cycle performance.

TABLE 1

Cycle test result

| | | Current rate | | | | | | | | | | | | | | | |
|---|---|---|---|---|---|---|---|---|---|---|---|---|---|---|---|---|---|
| | | 0.2 C | 0.4 C | 0.6 C | 0.8 C | 1.0 C | 1.2 C | 1.4 C | 1.6 C | 1.8 C | 2.0 C | 2.2 C | 2.4 C | 2.6 C | 2.8 C | 3.0 C | 3.2 C |
| Number of times of charging and discharging | 1 | 84% | 83% | 85% | 87% | 83% | 85% | 84% | 86% | 85% | 82% | 83% | 81% | 86% | 83% | 85% | 82% |
| | 2 | 86% | 86% | 87% | 86% | 85% | 86% | 85% | 83% | 82% | 86% | 82% | 85% | 86% | 85% | 86% | 85% |
| | 3 | 85% | 84% | 96% | 97% | 96% | 95% | 95% | 97% | 92% | 95% | 95% | 92% | 96% | 94% | 97% | 94% |
| | 4 | 86% | 87% | 96% | 93% | 97% | 95% | 96% | 91% | 93% | 91% | 91% | 95% | 94% | 91% | 92% | 94% |
| | 5 | 85% | 83% | 94% | 95% | 93% | 94% | 96% | 95% | 91% | 96% | 96% | 95% | 96% | 97% | 95% | 93% |
| | 6 | 83% | 85% | 95% | 91% | 97% | 92% | 94% | 95% | 96% | 96% | 91% | 96% | 97% | 95% | 95% | 97% |
| | 7 | 82% | 84% | 93% | 94% | 92% | 95% | 97% | 91% | 94% | 97% | 91% | 91% | 92% | 91% | 93% | 96% |
| | 8 | 86% | 86% | 96% | 96% | 95% | 94% | 92% | 93% | 92% | 95% | 91% | 92% | 94% | 94% | 94% | 94% |
| | 9 | 82% | 85% | 92% | 92% | 94% | 92% | 97% | 92% | 93% | 95% | 92% | 92% | 96% | 94% | 92% | 96% |
| | 10 | 85% | 86% | 91% | 95% | 92% | 93% | 96% | 97% | 91% | 95% | 92% | 97% | 91% | 94% | 95% | 96% |

"Number of times of charging and discharging" means the total number of times of charging and discharging. For example, in a case where the number of times of charging and discharging is "6" and the current rate is "1.0 C", the capacity retention rate is "97%".

Results

Figure 6:
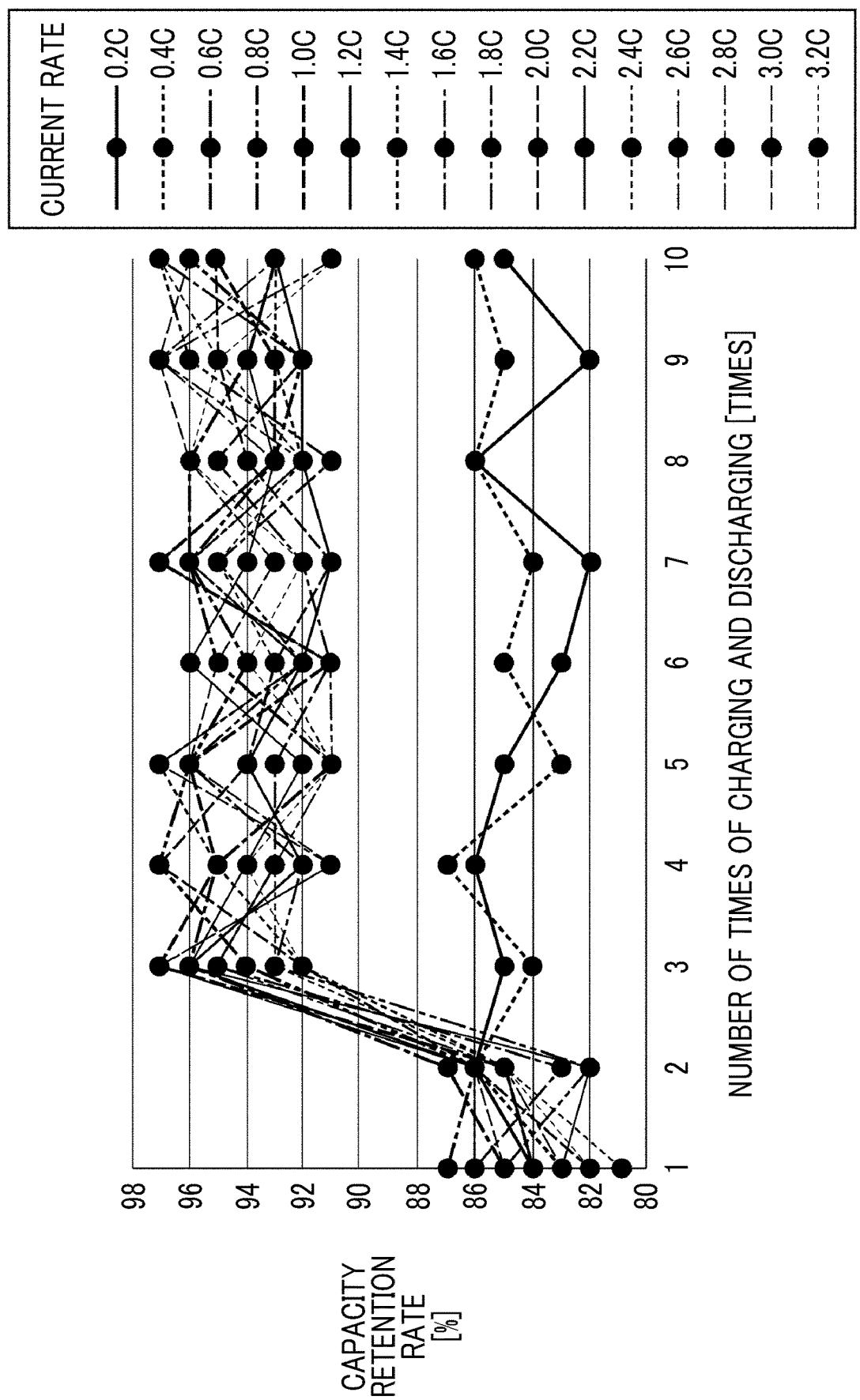
FIG. 6 is a graph showing the results of a cycle test.

FIG. 6 is a graph showing the results of the cycle test.

As shown in FIG. 6 and Table 1 described above, the cycle performance tends to be improved in a case where the current rate is 0.6 C or higher and the number of times of charging and discharging is 3 or greater in the alternate charging and discharging. It is considered that this is because the electrolytic solution permeates deep into the pores of the separator.

In the present example, it has been found that the irreversible capacity in the alternate charging and discharging tends to be small when the current rate is 2.6 C or lower.

The present embodiment and the present example are merely examples in all respects. The present embodiment and the present example are not restrictive. The technical scope defined by the description of claims includes all modifications semantically equivalent to the description of the claims. The technical scope defined by the description of claims includes all modifications in the same scope as the scope of the description of the claims.

What is claimed is:

1. A method for manufacturing a lithium ion battery, comprising:
   assembling a battery including a power storage element and an electrolytic solution;
   performing initial charging on the battery; and,
   performing alternate charging and discharging on the battery after the initial charging, wherein:
   the power storage element includes a positive electrode, a negative electrode, and a separator,
   the separator includes a portion interposed between the positive electrode and the negative electrode,
   the separator is porous, and
   in the alternate charging and discharging, charging and discharging are alternately performed once or more respectively at a voltage between 4.0 V and 4.1 V and a current rate of 0.6 C or higher,
   the total number of times of charging and discharging is 3 or greater,
   the charging is performed such that the voltage changes by 0.05 V or higher or 0.1 V or lower whenever the charging is performed once, and
   the discharging is performed such that the voltage changes by 0.05 V or higher or 0.1 V or lower whenever the discharging is performed once.

2. The method for manufacturing a lithium ion battery according to claim 1, wherein:
   the positive electrode contains a positive electrode active material,
   the positive electrode active material contains a material represented by the following Formula (1):

$$\text{LiNi}_x\text{Co}_y\text{M}_z\text{O}_2 \tag{1}$$

M in the Formula (1) contains at least one metal selected from the group consisting of Mn and Al, and
   x, y, and z in the Formula (1) satisfy relationships of $0.8 \leq x < 1$, $0 < y$, $0 < z$, and $x+y+z=1$.

3. The method for manufacturing a lithium ion battery according to claim 1, wherein:
   the negative electrode contains a negative electrode active material,
   the negative electrode active material contains a material represented by the following Formula (2):

$$\text{SiO}_w \tag{2}$$

w in the Formula (2) satisfies a relationship of $0 \leq w < 2$.

4. The method for manufacturing a lithium ion battery according to claim 1, wherein the current rate in the alternate charging and discharging is 2.6 C or lower.

5. The method for manufacturing a lithium ion battery according to claim 1, wherein the alternate charging and discharging end with charging.

* * * * *